(12) United States Patent
Mizuta et al.

(10) Patent No.: US 8,545,145 B2
(45) Date of Patent: Oct. 1, 2013

(54) SPINDLE INCLINATION DETECTOR AND MACHINE TOOL INCLUDING THE SAME

(75) Inventors: Keiji Mizuta, Hiroshima (JP); Yoshiharu Ozawa, Ritto (JP); Mutsumi Yoshikawa, Ritto (JP); Rimpei Kawashita, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1097 days.

(21) Appl. No.: 12/521,198

(22) PCT Filed: Dec. 5, 2007

(86) PCT No.: PCT/JP2007/073443
§ 371 (c)(1),
(2), (4) Date: Jul. 30, 2009

(87) PCT Pub. No.: WO2008/078519
PCT Pub. Date: Jul. 3, 2008

(65) Prior Publication Data
US 2010/0024206 A1   Feb. 4, 2010

(30) Foreign Application Priority Data
Dec. 26, 2006   (JP) ................................. 2006-349043

(51) Int. Cl.
*B23Q 15/18*   (2006.01)

(52) U.S. Cl.
USPC ................. 409/208; 409/239; 408/13; 33/503

(58) Field of Classification Search
USPC ............. 409/202, 207, 208, 238, 239; 408/8, 408/13; 33/392, 503, 703, 704

IPC ............. B23Q 1/01,11/10, 11/12, 11/14, 15/18, B23Q 17/22

See application file for complete search history.

(56) References Cited

U.S. PATENT DOCUMENTS

| 2,498,460 | A | * | 2/1950 | Shenefelt | ........................ 33/371 |
| 3,715,808 | A | * | 2/1973 | Petrik | ............................. 33/347 |
| 2007/0258781 | A1 | * | 11/2007 | Nishizaki et al. | ............. 409/208 |

FOREIGN PATENT DOCUMENTS

| JP | 57201142 A | * | 12/1982 |
| JP | 59001128 A | * | 1/1984 |

(Continued)

OTHER PUBLICATIONS

JPO Machine Translation—Natsukawa et al., Sep. 4, 1999, JP 11094546 A.*

*Primary Examiner* — Daniel Howell
*Assistant Examiner* — Michael Vitale
(74) *Attorney, Agent, or Firm* — Birch, Stewart, Kolasch & Birch, LLP (57) ABSTRACT

Spindle inclination detectors (41A, 41B) are equipped in columns (32A, 32B) of a portal bridge (24) of a machine tool (21). Each spindle inclination detector includes: a string (43) which hangs vertically with an upper end fixed to the column (reinforcement (32b)) and a lower end attached to a weight (45); a gap sensor (44) which is attached to the string to measure a distance to a front face plate (32a) of the column; and an oil damper (46). Moreover, a spindle inclination correction controller provided to the machine tool controls a Peltier device (42A, 42B) attached to a rear face plate (32d) of the column, on a basis of an average distance measured by the gap sensor, and thus corrects an inclination of a spindle (28) due to the thermal deformation of the column by correcting thermal deformation of the column.

2 Claims, 4 Drawing Sheets

(56) References Cited

FOREIGN PATENT DOCUMENTS

| | | |
|---|---|---|
| JP | 4-82649 A | 3/1992 |
| JP | 8-39311 A | 2/1996 |
| JP | 8-184435 A | 7/1996 |
| JP | 11-94546 A | 4/1999 |
| JP | 11-207615 A | 8/1999 |
| JP | 11-320211 A | 11/1999 |
| JP | 2001-162490 A | 6/2001 |
| JP | 2002-178234 A | 6/2002 |
| JP | 2002-355725 A | 12/2002 |
| JP | 2003-145373 A | 5/2003 |
| JP | 2003-300122 A | 10/2003 |
| JP | 2004-68825 A | 3/2004 |
| JP | 2004-337996 A | 12/2004 |
| JP | 2006090929 A * | 4/2006 |
| WO | WO 2006077629 A1 * | 7/2006 |

* cited by examiner

SPINDLE INCLINATION DETECTOR AND MACHINE TOOL INCLUDING THE SAME

BACKGROUND OF THE INVENTION

1. Field of the Invention

The present invention relates to a spindle inclination detector which detects an inclination (tilt) of a spindle and a machine tool including the spindle inclination detector.

2. Description of the Related Art

Conventional machine tools employ the following means in order to prevent reduction in machining accuracy due to thermal deformation of a structure.

(1) First means is to measure the temperature of a main portion of a machine tool to compensate the position of the tool tip according to a change amount in the temperature of the main portion <see Patent Document 1>

(2) Second means is to attach an insulator (a thermal insulating balancing wall panel) on a face plate of a structure such as a column or cross rail of a machine tool, the insulator having such a thickness that thermal equilibrium can be achieved <see Patent Document 2>

Patent Document 1: Japanese Patent Application Laid-open Publication No. 2004-337996

Patent Document 2: Japanese Patent Application Laid-open Publication No. 2003-145373

SUMMARY OF THE INVENTION

Problems To Be Solved by the Invention

In some machine tools, to minimize weight thereof while keeping necessary rigidity, face plates of a structure such as a column or cross rail supporting a spindle are made different in thickness between upper and lower face plates, between front and rear face plates, or between right and left face plates. In such a case, an air-temperature change around the machine tool leads to a difference in temperature change (convergence rate) among the face plates. A thinner face plate has a higher convergence rate. Accordingly, the upper and lower face plates, front and rear face plates, or right and left face plates which have different wall thicknesses become different in temperature. This results in deformation of the structure, thus causing a spindle inclination (tilt). Specific examples of the spindle inclination are described with reference to FIGS. 4 to 6.

Figure 4:
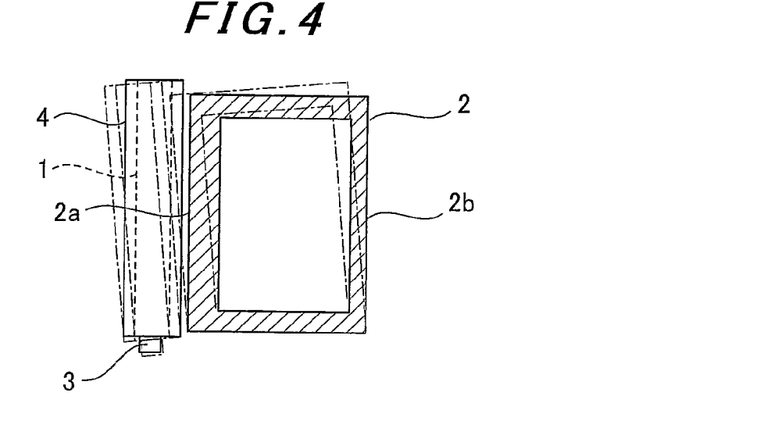
FIG. 4 is an explanatory view showing a concrete example of a spindle inclination.

In a machine tool shown in FIG. 4, a spindle 1 is rotatably supported by a ram 4, and the ram 4 is supported by a structure 2 such as a column or cross rail. On the spindle 1, a tool 3 to machine a workpiece is mounted. In this structure 2, front and rear face plates 2a and 2b are different in wall thickness from each other. In such a structure 2, with respect to the change in ambient temperature around the machine tool as exemplified in FIG. 6, the rate of change (convergence rate) in temperature A of the thin rear face plate 2b is higher than the rate of change (convergence rate) in temperature B of the thick front face plate 2a, thus resulting in a difference in temperature between the face plates 2a and 2b. For this reason, if the ambient temperature around the machine tool increases, the rear face plate 2b expands more than the front face plate 2a as indicated by dashed lines in FIG. 4, and the structure 2 (front face plate 2a) tilts forward. The spindle 1, which is supported by the structure 2, accordingly tilts (inclines) forward.

Figure 5:
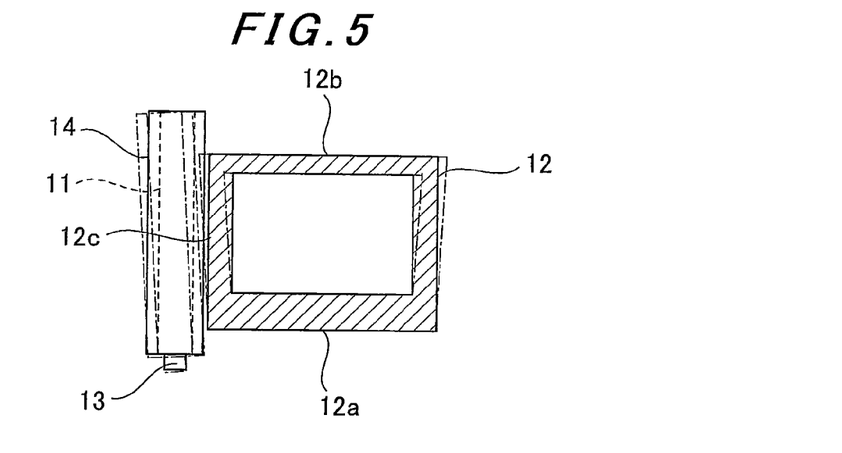
FIG. 5 is an explanatory view showing another concrete example of a spindle inclination.
Figure 6:
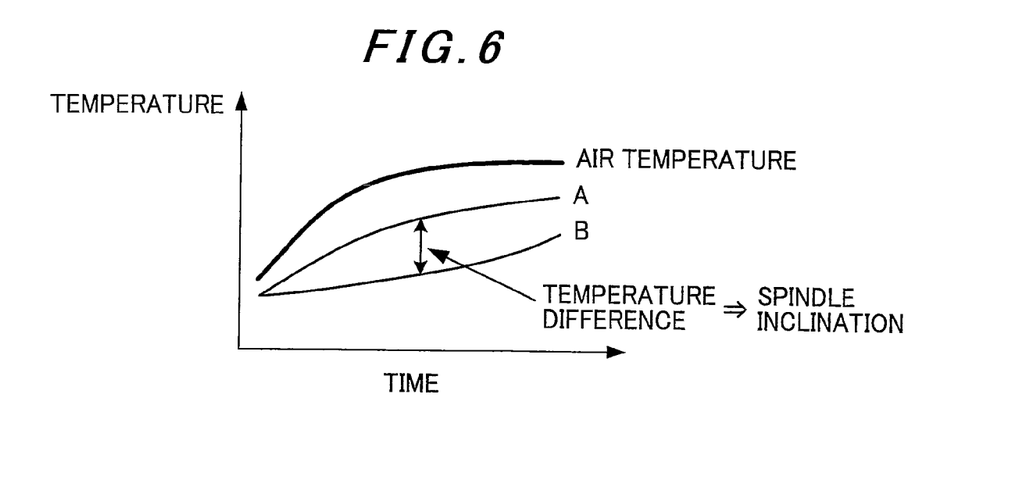
FIG. 6 is an explanatory view for exemplifying changes in temperature of face plates which are different in wall thicknesses from each other with respect to changes in air temperature.

In a machine tool shown in FIG. 5, a spindle 11 is rotatably supported by a ram 14, and the ram 14 is supported by a structure 12 such as a column or cross rail. On the spindle 11, a tool 13 to machine a workpiece is mounted. In this structure 12, upper and lower face plates 12a and 12b are different in wall thickness from each other. In such a structure 12, with respect to the change in ambient temperature around the machine tool as exemplified in FIG. 6, the rate of change (convergence rate) in temperature A of the thin upper face plate 12b is higher than the rate of change (convergence rate) in temperature B of the thick lower face plate 12a, thus resulting in the temperature difference between the face plates 12a and 12b. For this reason, if the ambient temperature around the machine tool increases, the upper face plate 12b expands more than the lower face plate 12a as indicated by dashed lines in FIG. 5, forming an inverted trapezoid. A front face plate 12c thereby tilts forward, and accordingly the spindle 11 supported by the structure 12 tilts (inclines) forward.

Against this problem, the aforementioned first means can compensate the displacements of the tips of the tools 3 and 13 due to thermal expansion and contraction of the respective structures 2 and 12 but cannot compensate the inclination of the spindles 1 and 11. In other words, the inclination of the spindles 1 and 11 (thermal deformation of the structures 2 and 12) cannot be detected, and thereby the inclination of the spindles 1 and 11 cannot be corrected. Meanwhile, in the case of the aforementioned second means, the insulator (the thermal insulating balancing wall panel) has a thickness optimal for preventing thermal deflection, but not optimal for preventing thermal twist. Accordingly, the inclination of the spindles 1 and 11 cannot be prevented, or the inclination of the spindles 1 and 11 (the thermal deformation of the structures) cannot be corrected. Note that, the thermal twist is a twist (thermal deformation) due to the temperature difference between a portion along one diagonal and a portion along the other diagonal, intersecting the one diagonal, of a rectangular face plate of a column or cross rail. A spindle inclination is also caused in this case.

Incidentally, as means for detecting a spindle inclination, it is considerable to measure a degree of a tilt with an electronic level meter such as an accelerator sensor. However, in the electronic level meter, temperature drifts occur due to self-heating or a change in temperature, and thus the electronic level meter has a low detection accuracy. Accordingly, the electronic level meter cannot detect a slight spindle inclination.

In the light of the aforementioned circumferences, an object of the present invention is to provide: a spindle inclination detector capable of surely detecting spindle inclination with a simple configuration, performing high accuracy detection with temperature drifts canceled, and correcting the spindle inclination (thermal deformation of a structure); and a machine tool including the spindle inclination detector.

Means for Solving the Problems

A first aspect of the present invention to solve the aforementioned problems provides a spindle inclination detector equipped in a machine tool including: a spindle to which a tool for machining a workpiece is attached; and a structure supporting the spindle. The spindle inclination detector includes: a string hanging vertically with an upper end fixed to the structure and with a lower end attached to a weight; and a distance sensor attached to the string to measure a distance to a measurement portion of the structure, or a distance sensor attached to the structure to measure a distance to a measurement portion of the string.

A second aspect of the present invention provides the spindle inclination detector according to the first aspect in which the distance sensor is a non-contact gap sensor.

A third aspect of the present invention provides the spindle inclination detector according to the first or second aspect of the present invention, further including: a viscous fluid damper having a viscous fluid accommodated in a vessel. The weight is put in the viscous fluid of the viscous fluid damper.

A fourth aspect of the present invention provides the spindle inclination detector according to any one of the first to third aspects of the present invention in which the string, the weight and the distance sensor are provided within the structure, or the string, the weight, the distance sensor and the viscous fluid damper are provided within the structure.

A fifth aspect of the present invention provides a machine tool including the spindle inclination detector according to any one of the first to fourth aspects of the present invention.

A sixth aspect of the present invention provides the machine tool according to the fifth aspect of the present invention, further including: temperature adjustment means which adjusts temperature of the structure; and a spindle inclination correction controller which corrects an inclination of the spindle due to the thermal deformation of the structure by correcting thermal deformation of the structure while controlling the temperature adjustment means on a basis of a distance measured by the distance sensor.

A seventh aspect of the present invention provides the machine tool according to the sixth aspect of the present invention, in which the spindle inclination correction controller calculates an average distance measured by the distance sensor, and corrects an inclination of the spindle due to thermal deformation of the structure by correcting the thermal deformation of the structure while controlling the temperature adjustment means on a basis of the calculated average.

An eighth aspect of the present invention provides the machine tool according to the sixth or seventh aspect, in which the spindle inclination correction controller determines whether the distance measured by the distance sensor is within a predetermined measurement range. When the measured distance is within the measurement range, the spindle inclination correction controller corrects an inclination of the spindle due to the thermal deformation of the structure by correcting the thermal deformation of the structure while controlling the temperature adjustment means on a basis of the measured distance.

A ninth aspect of the present invention provides the machine tool according to any one of the sixth to eighth aspects, in which the temperature adjustment means is a Peltier device. The Peltier device is attached to at least one of portions of the structure, the portions being subject to temperature differences.

A tenth aspect of the present invention provides the machine tool according to the ninth aspect of the present invention, in which the Peltier device is attached to each of the portions of the structure, the portions being subject to temperature differences. Additionally, the spindle inclination correction controller controls the Peltier device attached to a low-temperature portion among the portions subject to temperature differences so that the low-temperature portion can be heated, and controls the Peltier device attached to a high-temperature portion among the portions subject to temperature differences so that the high-temperature portion can be cooled.

Effects of the Invention

The spindle inclination detector according to the first aspect of the present invention includes: the string hanging vertically with the upper end fixed to the structure and with the lower end attached to the weight; and the distance sensor attached to the string to measure the distance to the measurement portion of the structure, or the distance sensor attached to the structure to measure the distance to the measurement portion of the string. Accordingly, if the structure is tilted by thermal deformation due to a temperature difference between portions (front and rear face plates; upper and lower face plates; or the like) of the structure to cause an inclination (tilt) of the spindle, there is a change in a relative positional relationship between the thermally deformed (tilted) structure and the vertically hanging string. Specifically, there is a change in the distance between the distance sensor attached to the string and the measurement portion of the structure or distance between the distance sensor attached to the structure and the measurement portion of the string. Such a change in distance is measured by the distance sensor. In other words, the distance measured by the distance sensor varies. It is therefore possible to detect thermal deformation (tilt) of the structure, that is, inclination (tilt) of the spindle, on the basis of the change in distance measured by the distance sensor. Accordingly, it is possible to surely detect the spindle inclination with such a simple structure at low cost.

Moreover, according to the second aspect of the present invention, the spindle inclination detector includes the non-contact gap sensor as the distance sensor. Accordingly, compared to the case of using a contact distance sensor, the distance sensor does not accidentally swing the string during the measurement of distance, thus performing more accurate distance measurement. Moreover, a commercially available gap sensor generally includes a function of canceling temperature drifts. Thus, when the gas sensor including such a function is used for the spindle inclination detector, it is possible to solve the problem of temperature drifts due to self-heating or changes in temperature.

Still moreover, according to the third aspect of the present invention, the spindle inclination detector includes the viscous fluid damper having the viscous fluid accommodated in the vessel, and the weight is put in the viscous fluid of the viscous fluid damper. Accordingly, the string and weight are less likely to be swung by external vibration or motion of the structure. Even when the string and weight are swung, such swing can be instantaneously attenuated by the viscous fluid. Therefore, the measurement of distance by the distance sensor can be performed with more accuracy.

Still moreover, in the spindle inclination detector according to the fourth aspect of the present invention, the members constituting the spindle inclination detector (the string, weight, and distance sensor; or the string, weight, distance sensor, and viscous fluid damper) are provided within the structure. Accordingly, it is possible to easily prevent these members from being interfered with an operator or a structure around the machine tool without a protection cover or the like, thus making it possible to surely detect the spindle inclination.

According to the fifth aspect of the present invention, the machine tool includes the spindle inclination detector according to any one of the first to fourth aspects of the present invention. It is therefore possible to fabricate an excellent machine tool having the effect of any one of the first to fourth aspects of the present invention.

Moreover, according to the sixth aspect of the present invention, the machine tool includes: the temperature adjustment means which adjusts temperature of the structure; and the spindle inclination correction controller which corrects the inclination of the spindle due to the thermal deformation of the structure by correcting the thermal deformation of the structure while controlling the temperature adjustment means on the basis of the distance measured by the distance sensor.

Accordingly, even when the structure is tilted by the thermal deformation due to the temperature difference between the portions (front and rear face plates, upper and lower face plates, or the like) of the structure to cause an inclination (tilt) of the spindle, the spindle inclination correction controller controls the temperature adjustment means on the basis of the distance, at this time, measured by the distance sensor while correcting the thermal deformation of the structure, thus making it possible to correct the spindle inclination.

Moreover, in the machine tool according to the seventh aspect of the present invention, the spindle inclination correction controller calculates the average distance measured by the distance sensor and corrects the inclination of the spindle due to the thermal deformation of the structure by correcting the thermal deformation of the structure while controlling the temperature adjustment means on the basis of the calculated average. Accordingly, even when the string and weight are swung by external vibration or the like, and then the output of the distance sensor is fluctuated, such fluctuation is cancelled by averaging the distance measured by the distance sensor. This is because such fluctuation is nearly sinusoidal. It is therefore possible to more accurately correct the thermal deformation of the structure, and thereby correct the spindle inclination.

Still moreover, in the machine tool according to the eighth aspect of the present invention, the spindle inclination correction controller determines whether the distance measured by the distance sensor is within a predetermined measurement range. When the measured distance is within the measurement range, the spindle inclination correction controller corrects the inclination of the spindle due to the thermal deformation of the structure by correcting the thermal deformation of the structure while controlling the temperature adjustment means on the basis of the measured distance. Accordingly, even when the string and weight are greatly swung by motion of the structure, external vibration, or the like, and then the distance measured by the distance sensor greatly varies, the measured distance exceeding a predetermined measurement range (over range) is ignored. It is therefore possible to more accurately correct the thermal deformation of the structure, and thereby correct the spindle inclination.

In the machine tool according to the ninth aspect of the present invention, the temperature adjustment means is a Peltier device. The Peltier device is attached to at least one of portions of the structure, the portions being subject to temperature differences. Accordingly, the temperature of the structure can be easily adjusted by the Peltier device with high accuracy. It is therefore possible to correct the thermal deformation of the structure more easily and accurately, and thereby correct the spindle inclination. Moreover, since it is only necessary that the sheet-shaped Peltier device be attached to the structure, the installation operation is made with great ease.

In the machine tool according to the tenth aspect of the present invention, the Peltier device is attached to each of the portions of the structure, the portions being subject to temperature differences. Additionally, the spindle inclination correction controller controls the Peltier device attached to the low-temperature portion among the portions subject to temperature differences so that the low-temperature portion can be heated, and controls the Peltier device attached to the high-temperature portion among the portions subject to temperature differences so that the high-temperature portion can be cooled. Accordingly, compared to the case of only heating the low-temperature portion or only cooling the high temperature portion with the Peltier device, it is possible to more easily correct the thermal deformation of the structure, and thereby correct the spindle inclination. Moreover, the amount of heat of the structure changes to a small extent, and the structure has little thermal expansion and contraction. Accordingly, it is not necessary to consider the thermal expansion and contraction of the structure, and thus it is only necessary to correct the spindle inclination.

21: machine tool; 22: bed; 23: table; 24: portal bridge; 25: cross rail; 26: saddle; 27: ram; 28: spindle; 29A and 29B: rail; 30: floor surface; 31A and 31B: wing; 32A and 32B: column; 33: top beam; 34A, 34B, 35A, and 35B: rail; 36: spindle motor; 37: tool; 41A and 41B: spindle inclination detector; 42A, 42A-1, 42A-2, 42B, 42B-1, and 42B-2: Peltier device; 43: string; 44: gap sensor; 45: weight; 46: oil damper; 47: vessel; 48: oil; 50: spindle inclination correction controller; 51: first measurement data processing section; 52: second measurement data processing section; 53: power supply

DETAILED DESCRIPTION OF THE INVENTION

Figure 1:
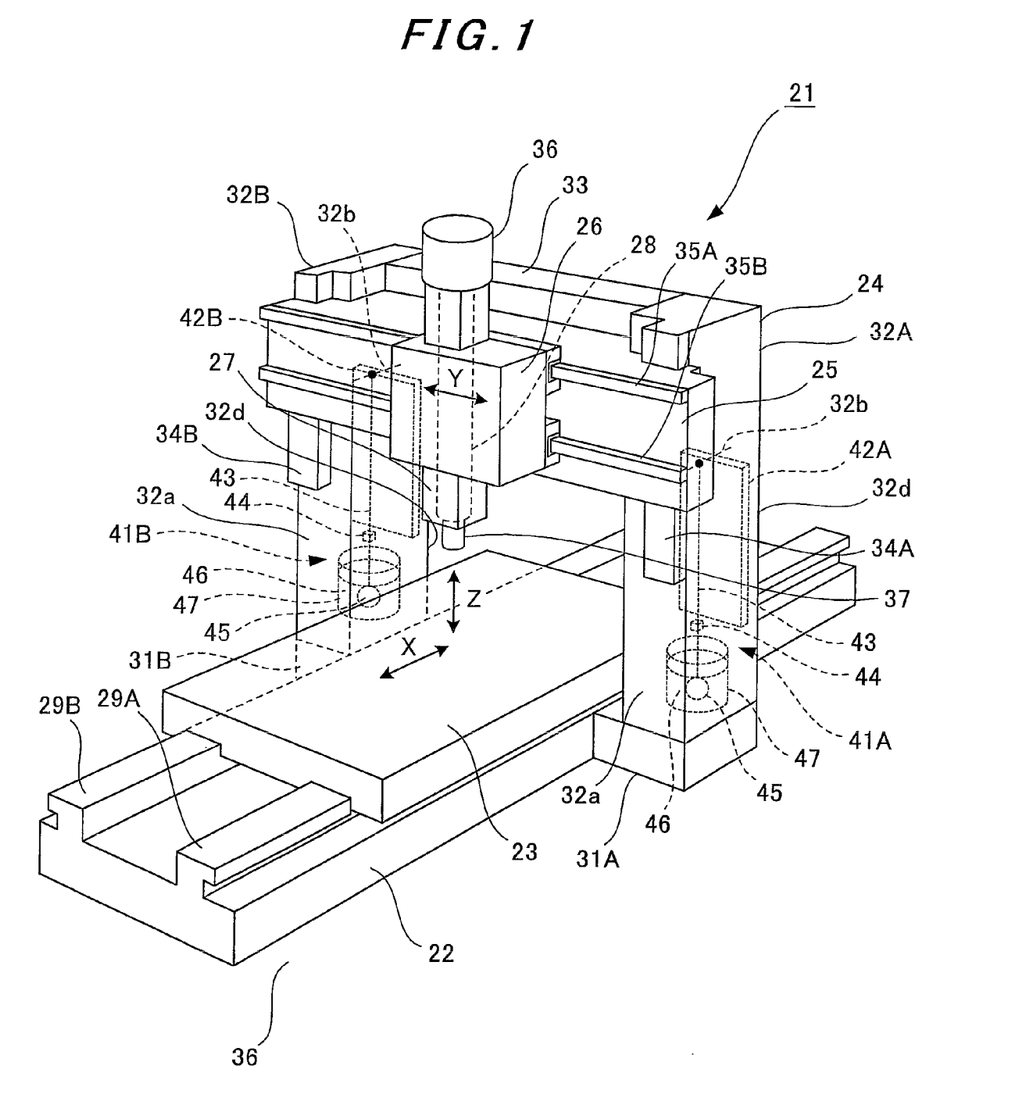
FIG. 1 is a perspective view of a machine tool according to Embodiment 1 of the present invention.
Figure 2:
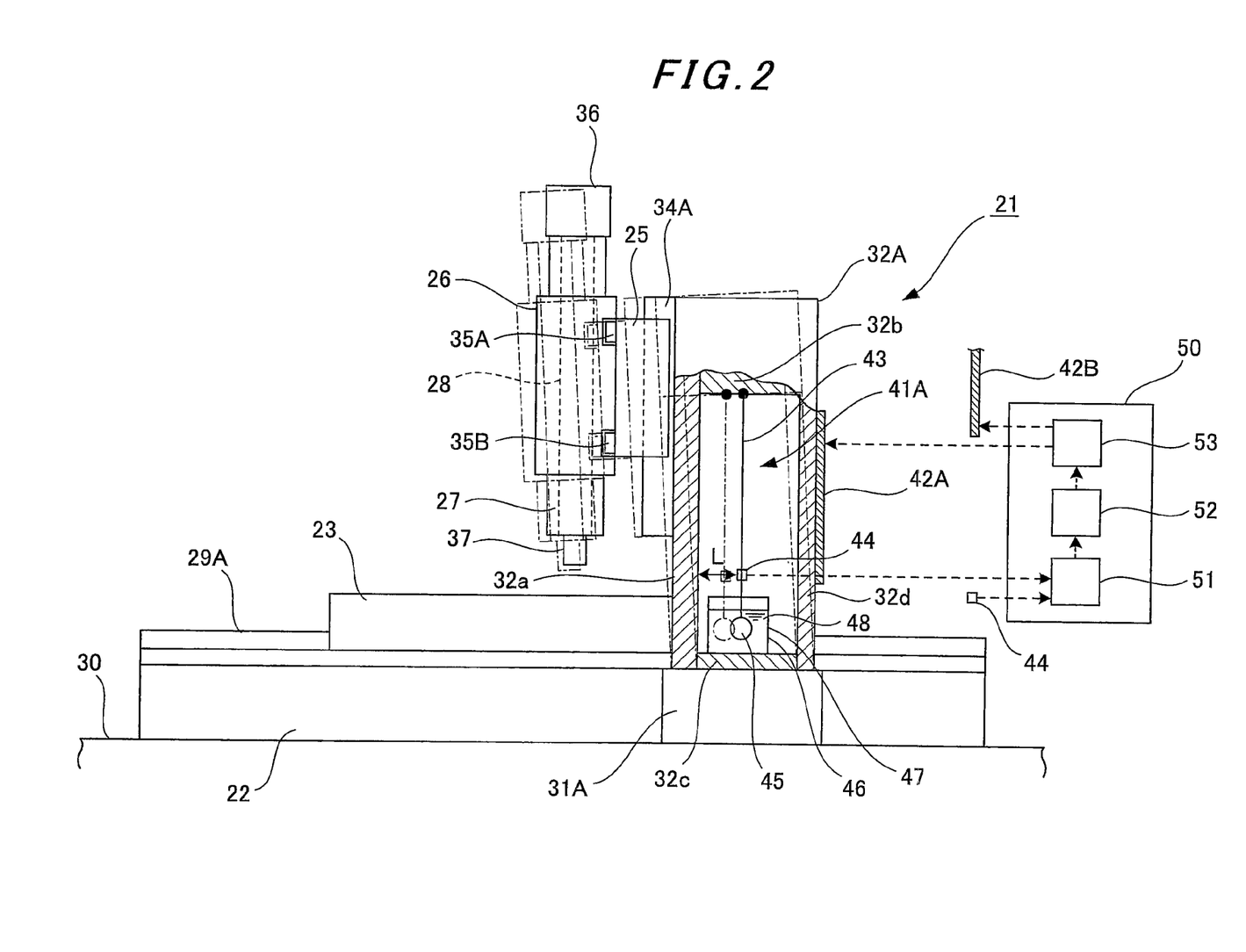
FIG. 2 is a partially cut-away side view of the machine tool.

Hereinafter, a specific description is given of embodiments of the present invention with reference to the drawings.
<Embodiment 1>
FIG. 1 is a perspective view of a machine tool according to Embodiment 1 of the present invention, and FIG. 2 is a partially cut-away side view of the machine tool.

As shown in FIGS. 1 and 2, a large-size machine tool 21 includes a bed 22, a table 23, a portal bridge 24, a cross rail 25, a saddle 26, a ram 27, and a spindle 28 as main structures.

The bed 22 is fixed to a floor surface 30. On an upper surface of the bed 22, provided are a pair of rails 29A and 29B horizontally extending in a longitudinal direction (X-axis direction) of the bed 22. The table 23 is slidably attached to the rails 29A and 29B. Accordingly, the table 23 is guided by the rails 29A and 29B to be horizontally moved in the longitudinal direction (X-axis direction) of the bed 22 by non-illustrated drive means including a feeding screw mechanism. Although omitted in the drawing, a workpiece to be machined by a tool 37 is placed on the table 23.

The portal bridge 24 is a portal one including a pair of columns 32A and 32B and a top beam 33, and is installed so as to straddle the table 23. The columns 32A and 32B are respectively stood on a pair of wings 31A and 31B, which are horizontally protruded on the right and left sides of the bed 22. The columns 32A and 32B are positioned on the right and left side of the table 23, respectively. The top beam 33 connects the upper ends of the columns 32A and 32B to each other.

On front faces (front face plates 32a) of the columns 32A and 32B, a pair of rails 34A and 34B extending vertically (in a Z-axis direction) are provided, respectively. The cross rail 25 is horizontally placed on the front face plate 32a side of the columns 32A and 32B, and slidably attached to the rails 34A and 34B. Accordingly, the cross rail 25 is guided by the rails 34A and 34B to be moved vertically (in the Z-axis direction) by non-illustrated drive means including a feed screw mechanism.

On a front face of the cross rail 25, provided are a pair of rails 35A and 35B horizontally extending in a longitudinal direction (Y-axis direction) of the cross rail 25. The saddle 26 is slidably attached to these rails 35A and 35B. Accordingly, the saddle 26 is guided by the rails 35A and 35B to be horizontally moved in the longitudinal direction (Y-axis direction) of the cross rail 25 by non-illustrated drive means including a feed screw mechanism.

The ram 27 is slidably inserted into the saddle 26, and can be moved vertically (in the Z-axis direction) by non-illustrated drive means including a feed screw mechanism. The spindle 28 is rotatably provided in the ram 27 and extends vertically (in the Z-axis direction). A spindle motor 36 is attached to the upper end of the ram 27, and the spindle 28 is rotatably driven by the spindle motor 36. The tool 37 for machining such as milling or drilling is mounted on an end of the spindle 28.

Accordingly, in this machine tool 21, the tool 37 is rotated together with the spindle 28, and moved in the Z-axis direction or Y-axis direction together with the ram 27, cross rail 25, and saddle 26, while the workpiece on the table 23 is moved in the X-axis direction together with the table 23, thus performing machining such as milling or drilling for the workpiece.

To minimize weight of the machine tool 21 while keeping necessary rigidity, the front and rear face plates 32a and 32d of each of the columns 32A and 32B differ in wall thickness. In such columns 32A and 32B, with respect to the change in ambient temperature around the machine tool as exemplified in FIG. 6, for example, the rate of change (convergence rate) in temperature of the thin rear face plate 32d is higher than the rate of change (convergence rate) in temperature of the thick front face plate 32a, thus resulting in the temperature difference between the face plates 32a and 32d. For this reason, if the ambient temperature around the machine tool 21 increases, the rear face plate 32d expands more than the front face plate 32a as indicated by dashed lines in FIG. 2 (FIG. 2 shows only the tilting column 32A, but the column 32B tilts in a similar manner), and the columns 32A and 32B (front face plates 32a) thus tilt forward. The spindle 28, which is supported by the columns 32A and 32B (front face plates 32a), thus tilts (inclines) forward.

In the machine tool 21, spindle inclination detectors 41A and 41B, Peltier devices 42A and 42B as temperature adjustment means, and a spindle inclination correction controller 50 are provided in order to detect and correct inclination of the spindle 28 due to thermal deformation (tilt) of the columns 32A and 32B.

The spindle inclination detectors 41A and 41B are respectively provided within the columns 32A and 32B, which are hollow. The Peltier devices 42A and 42B are sheet-shaped, and attached to the rear face plates 32d of the columns 32A and 32B, respectively. The Peltier devices 42A and 42B are devices utilizing the Peltier effect. By switching the direction in which current flows, heat generation and heat absorption can be switched. Moreover, by adjusting the amount of current, the amount of heat generated or absorbed can be adjusted.

As shown in FIG. 2, the spindle inclination detector 41A equipped in the column 32A includes a string 43, a weight 45, a non-contact gap sensor 44 as a distance sensor, an oil damper 46 as a viscous fluid damper. The string 43 hangs vertically with the upper end fixed to a reinforcement 32b within the column 32A and with the lower end attached to the weight 45. The string 43 can be made of a proper material and have a proper thickness, but should have a low-rigidity so as to always hang vertically even if the structure (the reinforcement 32b of the column 32A in the example shown in the drawing) to which the upper end of the string 43 is fixed is tilted.

The gap sensor 44 is attached to the string 43, and measures a distance L to the front face plate 32a of the column 32A (measurement portion). In this case, the measurement portion is not limited to a part of the front face plate 32a, and may be, for example, a measurement plate attached to the front face plate 32a. The gap sensor 44 may be attached to the front face plate 32a to measure a distance to the string 43 (measurement portion). In this case, the measurement portion is not limited to apart of the string 43, and may be, for example, a measurement plate attached to the string 43. Furthermore, the gap sensor 44 attached to the string 43 may measure a distance to the rear face plate 32d (measurement portion), or may be attached to the rear face plate 32d to measure a distance to the string 43 (measurement portion). In this case also, the measurement portion is not limited to a part of the rear face plate 32d or a part of the string 43, and may be, for example, a measurement plate attached to the rear face plate 32d or string 43.

The gap sensor 44 can be an eddy-current gap sensor, a capacitance gap sensor, an optical gap sensor which utilizes reflection of a laser beam, or the like. These gap sensors generally have a function of canceling temperature drifts with sufficient accuracy. Note that, in the case of using the eddy-current gap sensor, the material of the measurement portion needs to be metal in order to generate an eddy current. In the case of using the optical gap sensor, it is desirable that the material of the measurement portion have an excellent optical reflectivity.

In the example shown in the drawing, the columns 32A and 32B tilt forward due to thermal deformation. For this reason, in the case of measuring the distances to the front face plates 32a (measurement portions) with the gap sensors 44 attached to the strings 43 or measuring the distances to the strings 43 (measurement portions) with the gap sensors 44 attached to the front face plates 32a, the distances measured by the gap sensors 44 decrease according to thermal deformation (tilt) of the columns 32A and 32B. In contrast, in the case of measuring the distances to the rear face plates 32d (measurement portions) with the gap sensors 44 attached to the strings 43 or measuring the distances to the strings 43 (measurement portions) with the gap sensors 44 attached to the rear face plates 32d, the distances measured by the gap sensors 44 increase according to thermal deformation (tilt) of the columns 32A and 32B.

The oil damper 46 is provided on a lower face plate 32c of the column 32A, and accommodates oil 48 as a viscous fluid accommodated in a vessel 47. The weight 45 is put in the oil 48 in the vessel 47. Thus, even if the weight 45 swings together with the string 43 because of external vibration or the like, the swing of the weight 45 and string 43 is attenuated by the oil 48 of the oil damper 46 in a short time.

The configuration of the spindle inclination detector 41B equipped in the column 32B is the same as that of the spindle inclination detector 41A equipped in the column 32A, and thus the concrete description is omitted.

Distance measurement signals of each gap sensor 44 of the spindle inclination detectors 41A and 41B are inputted to the spindle inclination correction controller 50. The spindle inclination correction controller 50 corrects the inclination (tilt) of the spindle 28 due to the thermal deformation (tilt) of the columns 32A and 32B by correcting the thermal deformation (tilt) of the columns 32A and 32B while controlling the Peltier devices 42A and 42B on the basis of the distances measured by the respective gap sensors 44.

To be specific, the spindle inclination correction controller 50 includes a first measurement data processing section 51, a second measurement data processing section 52, and a power supply 53. Note that FIG. 2 shows only the relation between the spindle inclination correction controller 50 and spindle inclination detector 41A. The relation between the spindle inclination correction controller 50 and the spindle inclination detector 41B, which is not shown in the drawing, is the same as that in the case of the spindle inclination detector 41A.

The strings 43 (weights 45) of the spindle inclination detectors 41A and 41B are sometimes swung to a large extent by motion of the saddle 26 and cross rail 25. Then, the output signals (measured distances) from the gap sensors 44 change to a large extent independently of the thermal deformation (tilt) of the columns 32A and 32B. However, the thermal deformation (tilt) of the columns 32A and 32B always occurs in order of hours, and thereby the measured distances change in order of hours. On the other hand, the large change in the measured distance due to the motion of the saddle 26 and cross rail 25 is temporary.

For this reason, the first measurement data processing section 51 determines whether the distance measured by each gap sensor 44 is within a predetermined measurement range. As a result, when it is determined that the measured distance exceeds the measurement range (over range), the measured distance is not outputted to the subsequent second measurement data processing section 52. Only when it is determined that the measured distance is within the predetermined measurement range, the measured distance is outputted to the subsequent second measurement data processing section 52. In other words, such a temporary change in the measured distance exceeding the measurement range (over range) is ignored. Note that, the measurement range should be wider than a range of variations in measured distance due to thermal deformation (tilt) of the columns 32A and 32B, and should be properly set by experiments or the like.

Moreover, the strings 43 (weights 45) of the spindle inclination detectors 41A and 41B are sometimes swung by vibration of the machine tool 21 due to external vibration, resulting in fluctuation of the output signals (measured distance) from the gap sensors 44. Note that, such fluctuation is nearly sinusoidal.

For this reason, the second measurement data processing section 52 therefore calculates an average distance measured by each gap sensor 44 and outputted from the first measurement data processing section 51. In this case, the number of hours during which data points used to calculate the average measurement data (distances measured by the gap sensors 44) are taken should be properly determined considering a period of the fluctuation on the basis of experiments or the like.

Note that, the spindle inclination correction controller 50 of the example in the drawing performs both the measurement data processing by the first measurement data processing section 51 which ignores the temporary over range and the measurement data processing by the second measurement data processing section 52 which calculates the average of measured distances. However, the spindle inclination detector 41A is not limited to this, and may perform only one of the measurement data processing.

The power supply 53 allows current to flow through each of the Peltier devices 42A and 42B in a predetermined direction on the basis of the average of the distances measured by the gap sensors 44 which are outputted from the second measurement data processing section 52. Note that, in the case where only the measurement data processing by the first measurement data processing section 51 is performed, when the distance measured by the each gap sensor 44 is within the measurement range, the power supply 53 allows current to flow through each of the Peltier devices 42A and 42B in the predetermined direction on the basis of the measured distance. In the case where any measurement data processing by the first measurement data processing section 51 and the second measurement data processing section 52 is not performed, the power supply 53 allows current to flow through each of the Peltier devices 42A and 42B in the predetermined direction directly on the basis of the distance measured by each gap sensor 44.

In the example shown in the drawing, each of the Peltier devices 42A and 42B is respectively attached to the rear face plate 32d of the corresponding column 32A and 32B. When each of the columns 32A and 32B tilts forward due to thermal deformation, the power supply 53 allows current to flow through the Peltier devices 42A and 42B in such a direction that the Peltier devices 42A and 42B absorb heat. The rear face plates 32d are cooled by the heat absorption of the Peltier devices 42A and 42B, and the temperature of each rear face plate 32d is reduced by about 0.5° C., for example. Thereby, the thermal deformation (tilt) of the columns 32A and 32B is corrected, and thus the inclination of the spindle 28 is corrected. It is needless say that, in the case of attaching the Peltier devices 42A and 42B to the respective front face plates 32a, the power supply 53 allows current to flow through each of the Peltier devices 42A and 42B in such a direction that the Peltier devices 42A and 42B generate heat. In such a case, when the front face plates 32 are heated by the heat generation of the Peltier devices 42A and 42B, the temperature of each front face plate 32a is increased by about 0.5° C., for example. Thus, the thermal deformation (tilt) of the columns 32A and 32B is corrected, and accordingly the inclination of the spindle 28 is corrected.

Note that, in this case, for example, a certain amount of current may be allowed to flow through each of the Peltier devices 42A and 42B when the following data reaches a set value: that is, the average distance measured by each gap sensor 44 (in the case where both the measurement data processings by the first and second measurement data processing sections 51 and 52 are performed, or only the measurement data processing by the second measurement data processing section 52 is performed); the distance measured by each gap sensor 44, which is within the measurement range (in the case where only the measurement data processing by the first measurement data processing section 51 is performed); or the distance measured by each gap sensor 44 (in the case where any measurement data processing by the first and second measurement data processing sections 51 and 52 is not performed). Alternatively, in accordance with an amount of change in the average distance measured by each gap sensor 44, an amount of change in distance measured by each gap sensor 44, which is within the measurement range, or an amount of change in distance measured by each gap sensor 44, the current value to flow through each of the Peltier devices 42A and 42B may be adjusted (in other words, when the amount of change is increased, the current value is increased; when the amount of change is decreased, the current value is decreased).

As described above, according to the Embodiment 1, each of the spindle inclination detectors 41A and 41B includes: the string 43 which vertically hangs with the upper end fixed to the corresponding column 32A or 32B (the reinforcement 32b) and with the lower end attached to the weight 45; and the gap sensor 44 which is attached to the string 43 to measure the distance to the front face plate 32a (measurement portion) or rear face plate 32d (measurement portion) of the corresponding column 32A or 32B, or which is attached to the corresponding column 32A or 32B (front face plate 32a or rear face plate 32d) to measure the distance to the measurement portion of the string 43. Accordingly, if each of the columns 32A and 32B tilts because of thermal deformation due to the temperature difference between the front and rear face plates 32a and 32d to cause an inclination (tilt) of the spindle 28, there is a change in the relative positional relationship between each of the thermally deformed (tilted) columns 32A and 32B (front and rear face plates 32a and 32d) and each of the vertically hanging strings 43. Specifically, there is a change in the distance between each gap sensor 44 attached to each string 43 and the measurement portion of the corresponding column 32A or 32B (the front face plate 32a or rear face plate 32d), or distance between each gap sensor 44 attached to the corresponding column 32A or 32B (the front face plate 32a or rear face plate 32d) and the measurement portion at the string 43. Then, such a change in the distance is measured by each gap sensor. In other words, the distance measured by each gap sensor 44 changes. It is therefore possible to detect thermal deformation (tilt) of each of the columns 32A and 32B, that is, inclination (tilt) of the spindle 28, on the basis of the change in the distances measured by the gap sensors 44. Accordingly, it is possible to surely detect the spindle inclination with such a simple structure at low cost.

Moreover, according to Embodiment 1, each of the spindle inclination detectors 41A and 41B includes the non-contact gap sensor 44 as the sensor to measure the distance. Accordingly, compared to the case of using a contact distance sensor, the distance sensor does not accidentally swing the string during the measurement of distance, thus performing more accurate distance measurement. When the gas sensors 44 including the function of cancelling temperature drifts are used for the respective spindle inclination detectors 41A and 41B, it is possible to solve the problem of temperature drifts due to self-heating or changes in temperature.

Still moreover, according to Embodiment 1, each of the spindle inclination detectors 41A and 41B includes the oil damper 46 accommodating the oil 48 accommodated in the vessel 47, and the weight 45 is put in the oil 48 of the oil damper 46. Accordingly, the string 43 and weight 45 are less likely to be swung by external vibration or motion of the cross rail 25. Even when the string 43 and weight 45 are swung, such swing can be instantaneously attenuated by the oil 48. Therefore, the measurement of distance by the gap sensors 44 can be performed with more accuracy.

Still moreover, in the spindle inclination detectors 41A and 41B according to Embodiment 1, the members constituting the spindle inclination detectors 41A and 41B (the strings 43, weights 45, gap sensors 44, and oil dampers 46) are provided in the columns 32A and 32B, respectively. Accordingly, it is possible to easily prevent these members from being interfered with an operator or a structure around the machine tool 21 without a protection cover or the like, thus making it possible to surely detect the spindle inclination.

In addition, according to Embodiment 1, the machine tool 21 includes the spindle inclination detectors 41A and 41B having the above described structure. It is therefore possible to fabricate an excellent machine tool having the aforementioned effects.

Moreover, according to Embodiment 1, the machine tool 21 includes: the Peltier devices 42A and 42B respectively adjusting temperatures of the columns 32A and 32B; and the spindle inclination correction controller 50 which corrects the inclination of the spindle 28 due to the thermal deformation of the columns 32A and 32B by correcting the thermal deformation of the columns 32A and 32B while controlling the Peltier devices 42A and 42B on the basis of the average distance measured by the gap sensors 44. Accordingly, even when the columns 32A and 32B are tilted by the thermal deformation due to the temperature difference between the front and rear face plates 32a and 32d, to cause the inclination (tilt) of the spindle 28, the spindle inclination correction controller 50 individually controls the Peltier devices 42A and 42B on the basis of the average, at this time, of the distances measured by the gap sensors 44 while correcting the thermal deformation of the columns 32A and 32B, and thus making it possible to correct the spindle inclination.

Additionally, it is determined whether each of the distances measured by the gap sensors 44 is within the predetermined measurement range, and only the measured distance within the measurement range is used for the control. Accordingly, even when the strings 43 and weights 45 are greatly swung by motion of the cross rail 25, external vibration, or the like, and then the distances measured by the gap sensors 44 greatly vary, the measured distance exceeding the measurement range (over range) is ignored. It is therefore possible to more accurately correct the thermal deformation of the columns 32A and 32B, and thereby correct the spindle inclination.

Moreover, the average distance measured by the gap sensors 44 are used for the control. Accordingly, even when the strings 43 and weights 45 are swung by external vibration or the like, and then the outputs of the gap sensors 44 are fluctuated, such fluctuations are cancelled by averaging the distances measured by the gap sensors 44. It is therefore possible to more accurately correct thermal deformation of the columns 32A and 32B, and thereby correct the spindle inclination.

Furthermore, the Peltier devices 42A and 42B are used as the temperature adjustment means, and attached to the portions of the columns 32A and 32B (the front face plates 32a or rear face plates 32d), the portions being subject to temperature differences. Accordingly, the temperatures of the columns 32A and 32B can be easily adjusted by the Peltier devices 42A and 42B with high accuracy. It is therefore possible to more easily and accurately correct thermal deformation of the columns 32A and 32B, and thereby correct the spindle inclination. Moreover, since it is only necessary that the sheet-shaped Peltier devices 42A and 42B be attached to the columns 32A and 32B, the installation operation is made with great ease. Furthermore, since the front face plates 32a or rear face plates 32d can be heated and cooled by the Peltier devices 42A and 42B with an accuracy of ±0.1° C. as an example, it is possible to correct the thermal deformation (tilt) of the columns 32A and 32B within a range of, for example, ±100 µm/m with an accuracy of ±2 gm/m.

<Embodiment 2>

Figure 3:
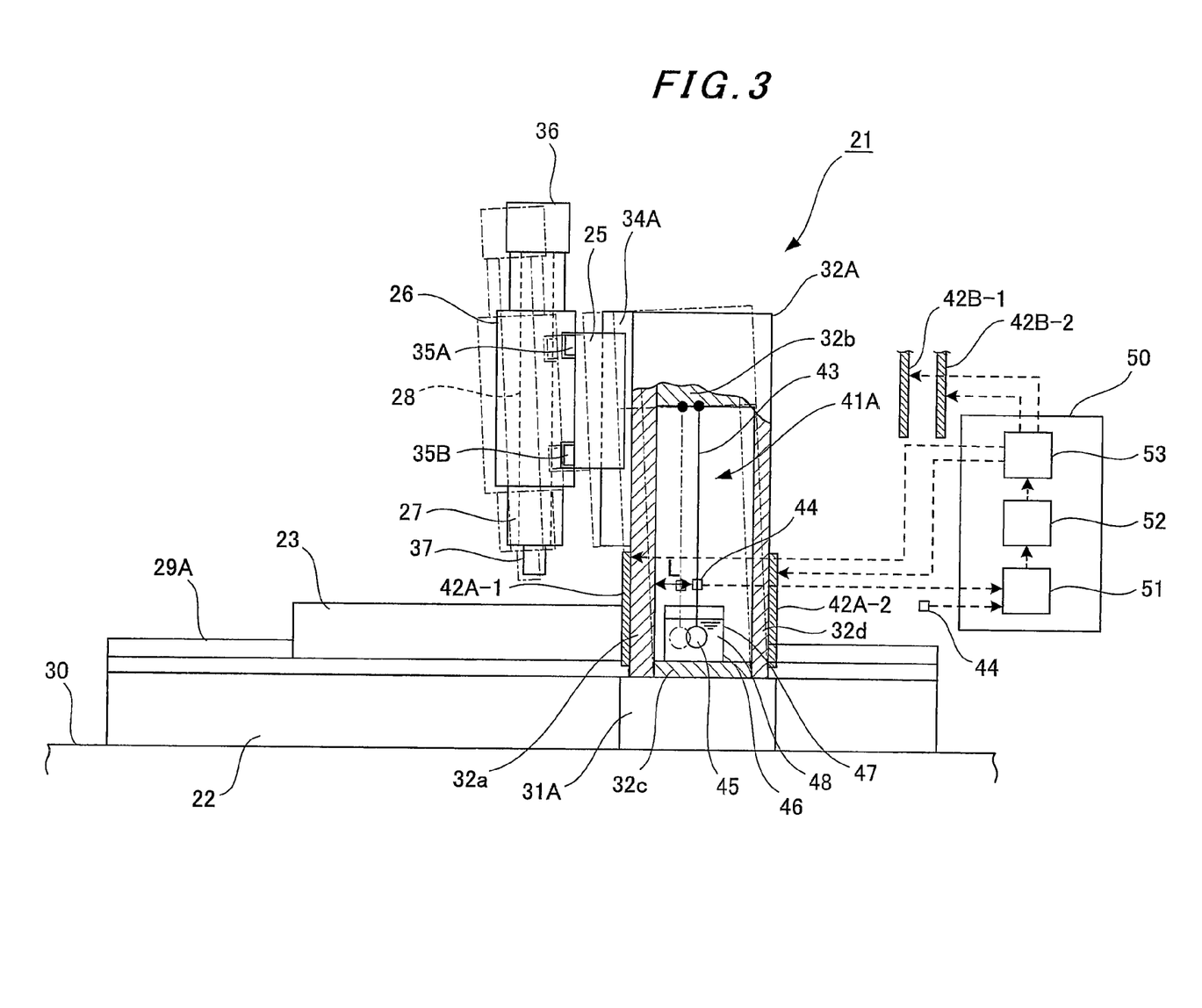
FIG. 3 is a partially cut-away side view of a machine tool according to Embodiment 2 of the present invention.

FIG. 3 is a partially cut-away side view of a machine tool according to Embodiment 2 of the present invention. The entire configuration of the machine tool according to Embodiment 2 shown in FIG. 3 is the same as that of the machine tool according to Embodiment 1 shown in FIGS. 1 and 2. In FIG. 3, the same parts as those in FIGS. 1 and 2 are donated by the same reference numerals.

As shown in FIG. 3, in the machine tool 21 according to Embodiment 2, two Peltier devices 42A-1 and 42A-2 are attached to the front face plates 32*a* and rear face plates 32*d* of the column 32A, respectively, and two Peltier devices 42B-1 and 42B-2 are attached to the front face plates 32*a* and rear face plates 32*d* of the column 32B (see FIG. 1), respectively, which are not shown in the drawing.

The power supply 53 of the spindle inclination correction controller 50 allows current to flow through each of the Peltier devices 42A-1, 42A-2, 42B-1, and 42B-2 in a predetermined direction on the basis of an average distance measured by each gap sensor 44 which is outputted from the second measurement data processing section 52. Note that, in the case where only the measurement data processing by the first measurement data processing section 51 is performed, when the distance measured by the each gap sensor 44 is within the measurement range, the power supply 53 allows current to flow through each of the Peltier devices 42A-1, 42A-2, 42B-1, and 42B-2 in the predetermined direction on the basis of the measured distance. Meanwhile, in the case where any measurement data processing by the first measurement data processing section 51 and the second measurement data processing section 52 is not performed, the power supply 53 allows current to flow through each of the Peltier devices 42A-1, 42A-2, 42B-1, and 42B-2 in the predetermined direction directly on the basis of the distance measured by each gap sensor 44.

In the example shown in the drawing, the columns 32A and 32B is inclined forward by thermal deformation. Accordingly, current flows through the Peltier devices 42A-1 and 42B-1 attached to the respective front face plates 32*a* in such a direction that the Peltier devices 42A-1 and 42B-1 generate heat. Meanwhile, current flows through the Peltier devices 42A-2 and 42B-2 attached to the respective rear face plates 32*d* in such a direction that the Peltier devices 42A-2 and 42B-2 absorb heat. The front face plates 32*a* are heated by the heat generation of the respective Peltier devices 42A-1 and 42B-1 thereby to increase in temperatures of the front face plates 32*a*, and simultaneously the rear face plates 32*d* are cooled by the heat absorption of the Peltier devices 42A-2 and 42B-2 to decrease in temperatures of the rear face plates 32*d*. The thermal deformation (tilt) of the columns 32A and 32B are thus corrected, and accordingly the inclination of the spindle 28 is corrected.

Note that, in this case as similar to Embodiment 1, a certain amount of current may be allowed to flow through each of the Peltier devices 42A-1, 42A-2, 42B-1 and 42B-2 when the following data reaches a set value: that is, the average distance measured by each gap sensor 44 (in the case where both the measurement data processings by the first and second measurement data processing sections 51 and 52 are performed, or only the measurement data processing by the second measurement data processing section 52 is performed); the distance measured by each gap sensor 44, which is within the measurement range (in the case where only the measurement data processing by the first measurement data processing section 51 is performed); or the distance measured by each gap sensor 44 (in the case where any measurement data processing by the first and second measurement data processing sections 51 and 52 is not performed). Alternatively, in accordance with an amount of change in the average distance measured by each gap sensor 44, an amount of change in the distance measured by each gap sensor 44, which is within the measurement range, or an amount of change in distance measured by each gap sensor 44, the current value to flow through each of the Peltier devices 42A-1, 42A-2, 42B-1, and 42B-2 maybe adjusted (in other words, when the amount of change is increased, the current value is increased; when the amount of change is decreased, the current value is decreased).

Note that, the other configuration of the machine tool 21 according to Embodiment 2 is the same as that of the machine tool 21 according to Embodiment 1 (see FIGS. 1 and 2), and the detailed description thereof is omitted herein.

As described above, the machine tool according to Embodiment 2 has the following features. Specifically, the Peltier devices 42A-1 and 42B-1 and the Peltier devices 42A-2 and 42B-2 are respectively attached to the front face plates 32*a* and rear face plates 32*d* of the columns 32A and 32B, which are subject to temperature differences. The spindle inclination correction controller 50 controls the Peltier devices 42A-1 and 42B-1 attached to the front face plates 32*a* as low-temperature portions among the portions subject to temperature differences so that the front face plates 32*a* can be heated. The spindle inclination correction controller 50 controls the Peltier devices 42A-2 and 42B-2 attached to the rear face plates 32*d* as high-temperature portions among the portions subject to temperature differences so that the rear face plates 32*d* can be cooled. Accordingly, compared to the case of only heating the low-temperature portions (the front face plates 32*a*) with the Peltier devices or only cooling the high-temperature portions (the rear face plates 32*d*) with the Peltier devices, it is possible to easily correct the thermal deformation of the columns 32A and 32B, and thereby correct the spindle inclination. Moreover, an amount of heat of each of the columns 32A and 32B changes to a small extent, and thus the columns 32A and 32B have little thermal expansion and contraction. Accordingly, it is not necessary to consider the thermal expansion and contraction of the columns 32A and 32B, and thus it is only necessary to correct the spindle inclination.

Note that, the above description is given of the case where the spindle inclination detector according to the present invention is adopted to the large portal machine tool. However, the spindle inclination detector according to the present invention is not limited to this, and can be adopted to various types of machine tools such as a small machine tool, a machine tool with a single column, and a machine tool with a moving column.

Moreover, the above description is given of the case where the spindle inclination detector is equipped in each column. The provision of the spindle inclination detector is not limited to this, and it is possible to provide the spindle inclination for various types of structures such as a saddle or cross rail supporting the spindle. For example, when the spindle inclination detector is provided for the cross rail, it is possible to detect not only spindle inclination due to thermal deformation (tilt) of the cross rail but also spindle inclination due to thermal deformation (tilt) of the columns because the cross rail is tilted together with the spindle by the thermal deformation (tilt) of the columns. Meanwhile, when the spindle inclination detector is provided for the saddle, it is possible to detect not only spindle inclination due to thermal deformation of the saddle but also spindle inclination due to thermal deformation (tilt) of the columns and thermal deformation (tilt) of the cross rail because the saddle is tilted together with the spindle by the thermal deformation (tilt) of the columns and the thermal deformation (tilt) of the cross rail. In other words, the spindle inclination detector may be provided for not only a structure which is thermally deformed (tilted) to directly cause spindle inclination but also other structures which are tilted together with the spindle by the thermal deformation of the structure which is thermally deformed to directly cause spindle inclination.

The above description is given of detection of the spindle inclination in the case where the front and rear face plates have different wall thicknesses. However, it is needless to say that the spindle inclination detector according to the present invention is not limited to such a case, and can be adopted for detection of the spindle inclination in cases where the upper and lower face plates have different wall thicknesses and where the right and left face plates have different wall thicknesses. Furthermore, the spindle inclination detector according to the present invention can be adopted for detection of the spindle inclination due to twist of the cross rail and the like. In this case, the Peltier device should be attached to one or both of a portion along one diagonal and a portion along the other diagonal, intersecting the one diagonal, of a rectangular face plate of the cross rail and the like. In other words, the Peltier device only needs to be attached to at least one of portions, subject to temperature differences, of a structure which is thermally deformed because of the temperature difference causing the spindle inclination.

The temperature adjustment means is desirably, but not necessarily limited to, a Peltier device. The temperature adjustment means may be one which adjusts temperature of the structure with, for example, a temperature adjusting fluid (hot water, cold water, or the like).

Industrial Applicability

The present invention relates to a spindle inclination detector which detects an inclination (tilt) of a spindle and a machine tool including the spindle inclination detector, and is useful in applications to various machine tools such as a large portal machine tool.

The invention claimed is:

1. A machine tool having a spindle to which a tool for machining a workpiece is attached, and a structure supporting the spindle, the machine tool comprising:
   a spindle inclination detector including,
      a string hanging vertically with an upper end fixed to the structure and with a lower end attached to a weight, and
      any one of a distance sensor attached to the string to measure a distance to a measurement portion of the structure, and a distance sensor attached to the structure to measure a distance to a measurement portion of the string;
   temperature adjustment means which adjusts temperature of the structure; and
   a spindle inclination correction controller which corrects an inclination of the spindle due to thermal deformation of the structure, by correcting the thermal deformation of the structure while controlling the temperature adjustment means on the basis of a distance measured by the distance sensor, wherein
   the spindle inclination correction controller calculates an average distance measured by the distance sensor, and corrects an inclination of the spindle due to thermal deformation of the structure by correcting the thermal deformation of the structure while controlling the temperature adjustment means on a basis of the calculated average.

2. A machine tool having a spindle to which a tool for machining a workpiece is attached, and a structure supporting the spindle, the machine tool comprising:
   a spindle inclination detector including,
      a string hanging vertically with an upper end fixed to the structure and with a lower end attached to a weight, and
      any one of a distance sensor attached to the string to measure a distance to a measurement portion of the structure, and a distance sensor attached to the structure to measure a distance to a measurement portion of the string;
   temperature adjustment means which adjusts temperature of the structure; and
   a spindle inclination correction controller which corrects an inclination of the spindle due to thermal deformation of the structure by correcting the thermal deformation of the structure while controlling the temperature adjustment means on the basis of a distance measured by the distance sensor, wherein
   the spindle inclination correction controller determines whether the distance measured by the distance sensor is within a predetermined measurement range, and
   when the measured distance is within the measurement range, the spindle inclination correction controller corrects an inclination of the spindle due to the thermal deformation of the structure by correcting the thermal deformation of the structure while controlling the temperature adjustment means on a basis of the measured distance.

* * * * *